United States Patent
Cardno et al.

(10) Patent No.: US 8,669,994 B2
(45) Date of Patent: *Mar. 11, 2014

(54) DATA VISUALIZATION METHODS

(75) Inventors: Andrew John Cardno, San Diego, CA (US); Peter Stewart Ingham, Avalon (NZ); Bart Andrew Lewin, Woodland Hills, CA (US); Ashok Kumar Singh, Henderson, NV (US)

(73) Assignee: New Bis Safe Luxco S.A R.L, Luxembourg (LU)

( * ) Notice: Subject to any disclaimer, the term of this patent is extended or adjusted under 35 U.S.C. 154(b) by 274 days.

This patent is subject to a terminal disclaimer.

(21) Appl. No.: 12/866,842

(22) PCT Filed: Nov. 13, 2009

(86) PCT No.: PCT/NZ2009/000246
§ 371 (c)(1),
(2), (4) Date: Mar. 3, 2011

(87) PCT Pub. No.: WO2010/056132
PCT Pub. Date: May 20, 2010

(65) Prior Publication Data
US 2011/0141118 A1   Jun. 16, 2011

Related U.S. Application Data

(60) Provisional application No. 61/115,037, filed on Nov. 15, 2008.

(51) Int. Cl.
*G09G 5/00* (2006.01)
*G06T 11/20* (2006.01)

(52) U.S. Cl.
USPC .............. 345/581; 345/440; 345/441

(58) Field of Classification Search
None
See application file for complete search history.

(56) References Cited

U.S. PATENT DOCUMENTS

| | | | |
|---|---|---|---|
| 7,280,105 B2 * | 10/2007 | Cowperthwaite | 345/419 |
| 7,562,039 B2 * | 7/2009 | Evertsz et al. | 705/36 R |
| 7,734,607 B2 * | 6/2010 | Grinstein et al. | 707/705 |
| 7,967,451 B2 * | 6/2011 | Chen et al. | 353/98 |
| 2002/0174049 A1 * | 11/2002 | Kitahara | 705/36 |
| 2004/0148247 A1 * | 7/2004 | Miller et al. | 705/37 |
| 2005/0066277 A1 | 3/2005 | Leah et al. | |
| 2007/0198203 A1 * | 8/2007 | Kimura | 702/85 |
| 2008/0091757 A1 * | 4/2008 | Ingrassia et al. | 708/490 |

FOREIGN PATENT DOCUMENTS

WO   WO 2009/154483   12/2009

OTHER PUBLICATIONS

"Computer Processing Aids Spatial Neighborhood Analysis." *GeoWorld*. 2005. pp. 18-19. http://www.innovativegis.com/basis/MapAnalysis/Topic26/Topic26.htm.

* cited by examiner

*Primary Examiner* — Joni Richer
*Assistant Examiner* — Yi Wang
(74) *Attorney, Agent, or Firm* — Morgan, Lewis & Bockius LLP

(57) ABSTRACT

A method of creating a graphical representation of data in the form of a heatmap, the method including the steps of: positioning data points on a heatmap for graphical representation, calculating conical data distribution values around a data point based on a data value associated with that data point and rendering the heatmap based on the calculated data distribution values.

17 Claims, 10 Drawing Sheets

DATA VISUALIZATION METHODS

This application is a National Stage Application of PCT/NZ2009/000246, filed 13 Nov. 2009, which claims benefit of U.S. Ser. No. 61/115,037, filed 15 Nov. 2008 and which applications are incorporated herein by reference. To the extent appropriate, a claim of priority is made to each of the above disclosed applications.

FIELD OF THE INVENTION

The present invention relates to improved data visualization methods. In particular, the present invention relates to various methods of creating graphical representations of data in the form of heatmaps.

BACKGROUND

A chart or graph is described in Wikipedia as a type of information graphic or graphic organizer that represents tabular numeric data and/or functions. Charts are often used in an attempt to make it easier to understand large quantities of data and the relationship between different parts of the data. Charts can usually be read more quickly than the raw data that they come from. They are used in a wide variety of fields, and can be created by hand (often on graph paper) or by general purpose computers or specific computers using various different charting applications.

Traditional charts use well established and often poorly implemented ways of representing data. Many tools exist to help the user construct very sophisticated representations of data but that sophistication typically results in less meaningful charts. Embodiments of the present invention aim to overcome this problem.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that are most required and relevant to an end user.

One known method of visualizing data is the heatmap. A heatmap identifies the values of individual data points by allocating a specific color based on the data point value. For example, red may indicate that the data point value is high, and blue may indicate that the data point value is low. The color spectrum in between red and blue may then be used to indicate the interim values for relevant data points. The heatmap graphic is particularly useful for showing the position and intensity of certain data values with respect to other data values and within a defined environment, such as a geographical area, temporal period or other environment.

It is known to create heatmaps using an inverse distance weighted (IDW) formula, such as a bell shaped curve. However, these methods are extremely complex and can cause artefacts, and so can be particularly problematic. It is also known to use a cubic spline method to create a heatmap, however this method is particularly processor (CPU) intensive.

The heatmaps produced by the above described methods, such as that shown in FIG. 1, can produce quite garish and intense maps that tend to confuse the eye of the reader due its non-organic appearance.

In particular, the heatmap of FIG. 1 is produced by rendering circles around a specific data point, where the color and diameter of the circle is based on a variable associated with the data point. Smaller diameter circles are used to represent smaller data point values and larger diameter circles are used to represent larger data point values. Further, the larger the circle (or data point value) the "hotter" the color used to represent the circle. For example, largest values may be rendered using large circles in the color red, whereas smallest values may be rendered using small circles colored blue. At points where the circles overlap, the circle associated with the largest data point value has priority over the smaller circles and the color for the larger circle is shown in the overlap region. A first problem associated with this method of rendering the overlapped region is that only the values of data points representing the largest values are represented in the overlap regions and an accurate representation of the overlap regions is not provided. For example, two data points that are close to each other which represent a maximum value will be rendered using the same color as three or four (or more) data points that are close to each other which represent the same maximum value. A further problem occurs when data points representing smaller values are positioned next to or close to data points representing larger values as the rendered larger value data points obscure the rendered smaller value data points. This can therefore result in a loss of information being conveyed to the user as minimal data values may be considered as a very important part of the data analysis of the data set.

Prior known methods typically use spread functions, such as bell shaped curves, to calculate interpolation values for each point on a heatmap. These spread functions tail off over a long distance (graphically) and so may require each point to take into account all other data points, even if positioned a large graphical distance away form the data point being calculated. Therefore, high levels of computing are required to calculate all values on the heatmap as all points influence all other points.

The present invention aims to overcome, or at least alleviate, some or all of the mentioned problems, or to at least provide the public with a useful choice.

SUMMARY OF THE INVENTION

The present invention provides a system and method that enables efficient production of heatmaps.

According to one aspect, the present invention provides a method of creating a graphical representation of data in the form of a heatmap, the method including the steps of positioning data points on a heatmap for graphical representation, calculating conical data distribution values around a data point based on a data value associated with that data point and rendering the heatmap based on the calculated data distribution values.

According to a further aspect, the present invention provides a graphical computing system for generating a heatmap including: a data point calculation module arranged to position data points on a heatmap for graphical representation, and calculate conical data distribution values around a data point based on a data value associated with that data point, and a rendering module arranged to render the heatmap based on the calculated data distribution values.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
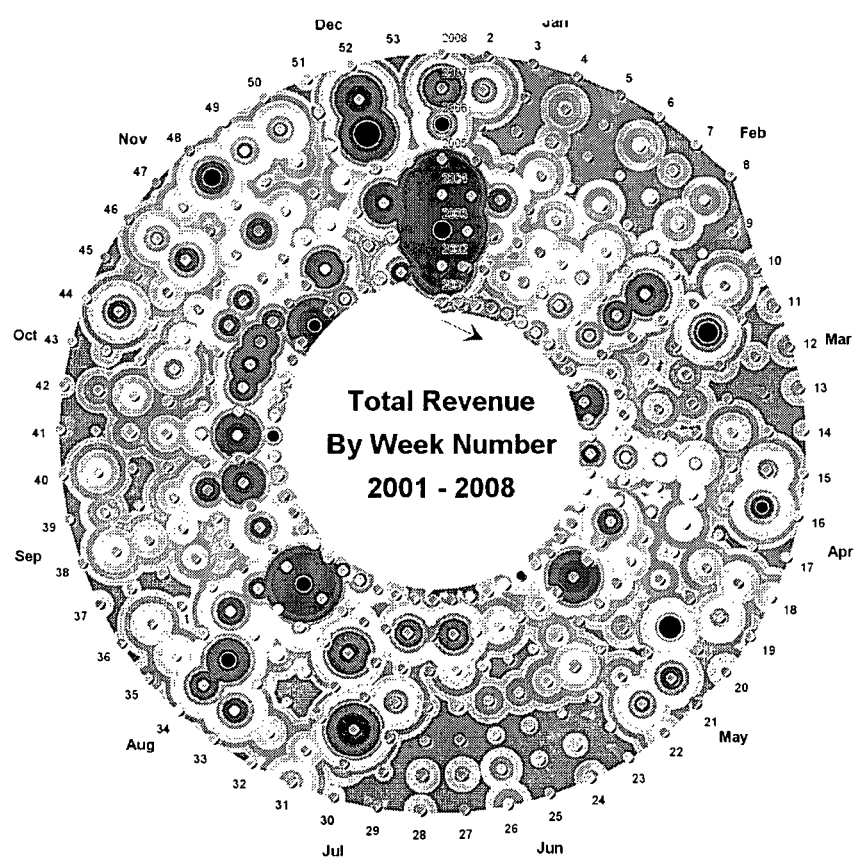
FIG. 1 shows an example of a heatmap using a prior known method.

The following described invention is suitable for use in conjunction with other methods, and the incorporation into one or more systems, described in an earlier filed US provisional patent application by the applicant. Namely, U.S. provisional patent application 61/074,347 filed on 20 Jun. 2008, and entitled METHODS, APPARATUS AND SYSTEMS FOR DATA VISUALISATION AND RELATED APPLICATIONS, which is hereby incorporated by reference.

Embodiments of the present invention are described herein with reference to a system adapted or arranged to perform various methods of creating graphical heatmap representations.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a retail environment analysis computer, a manufacturing data analysis computer, a business intelligence computer etc., where the computer has been specifically adapted to perform the described steps on specific data captured from an environment associated with a particular field.

As a particular example, the methods described herein may be applied or implemented using a gaming data analysis computer wherein a gaming environment is monitored and data associated with the gaming environment is stored in a data storage module and represented using a heatmap as described herein. The gaming data used to develop the heatmap may be related, for example, to the operations of a casino and may include, for example, data associated with the performance of various gaming machines and devices, as well as data associated with ATMs, cashiers, gaming tables, slot machines, electronic gaming machines, kiosks, related hotel devices etc.

As a further particular example, the methods described herein may be applied or implemented using a retail environment analysis computer wherein a retail environment is monitored and data associated with the retail environment is stored in a data storage module and is represented using a heatmap as described herein. The retail data used to develop the heatmap may be related, for example, to purchasing information associated with consumers, products sold in the retail environment, profit margins, purchasing costs, manufacturing costs, sale prices, consumer prices, the location of the retail environment and related premises, distribution data etc.

Figure 2A:
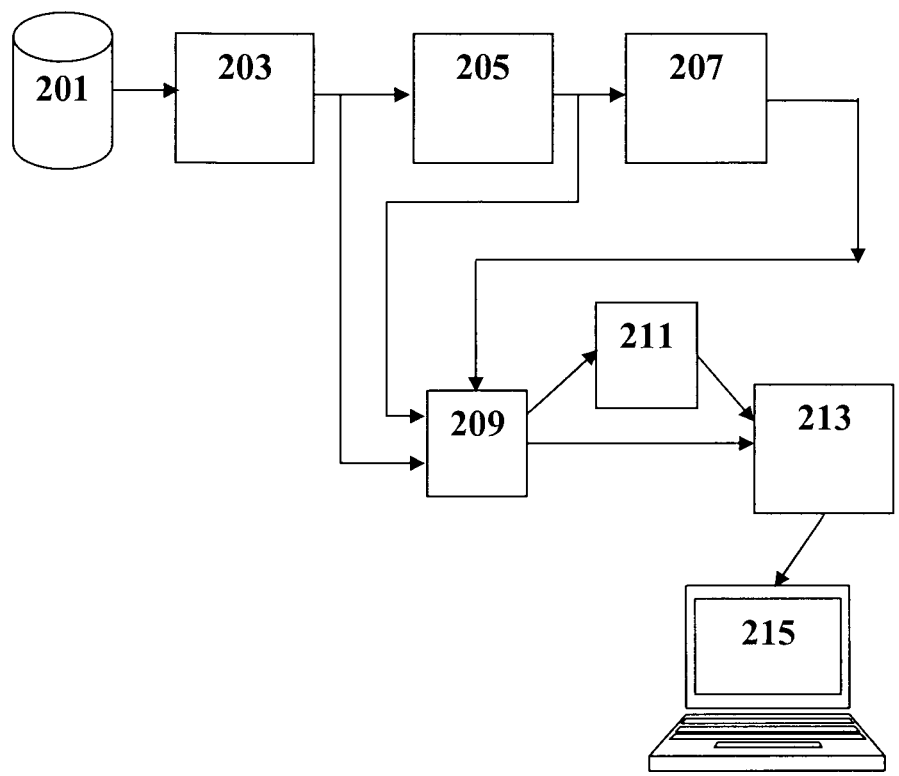
FIG. 2A shows a system block diagram of a data visualization system according to an embodiment of the present invention.

FIG. 2A shows a system block diagram of a data visualization system specifically adapted to perform the various methods as herein described.

A data storage module 201 provides data to a data retrieval module 203 upon request from the data retrieval module. That is, the data retrieval module 203 is configured to enable the retrieval of data from a data storage module 201, which is in communication with the data visualization system. The data storage module 201 may be any suitable type of data storage system. For example, it may be an enterprise data warehouse (EDW), a data mart, a database, a storage array or any other suitable device or groups of devices that can store data for later retrieval. Further, the data storage module 201 may be a cache memory used to temporarily store incoming data captured in real time.

A data point calculation module 205 receives or accesses the data from the data retrieval module 203 in order to calculate the values on and around each of the data points, as will be described in more detail below. In summary, the data point calculation module applies a geometric spatial distribution in the form of a substantially conic distribution about the data point based on the data point value. In this embodiment an exact conical distribution method is used. However, it will be understood that the terms cone, conic or conical distribution include other conic type distribution forms that may be applied other than the exact conic form in order to produce the advantages of the present invention. Indeed, the shape of the distribution around a data point may be tailored to the type of data being analyzed. Certain forms of data may be more suited to certain types of conic distribution in order to more accurately convey the data's properties.

Due to the use of the data point calculation module as described herein, an interpolation module is not required in order to calculate points in between known data points. Interpolation between data points is not required as the distribution calculations around a data point perform this task. This therefore provides a more efficient heatmap generation system.

A minima check module 207 performs a check on each of the calculated data point values for each of the data points to see whether the value generated for the data point using the data point calculation module 205 is greater than the actual value of that data point. This may occur where two data points are close to each other such that a first data point representing a large value swamps a second data point representing a smaller value. That is, if the heatmap were rendered, the minima value being represented by the second data point would not be shown after the data point calculation module has made the required calculations because the cone generated by the data point calculation module for the first data point engulfs the minima value of the second data point. The minima check module retrieves the original data for the data point and compares it with the calculated data point value.

If the minima check module 207 determines that the associated data point value has been hidden by an adjacent larger data point, a data point inverse calculation module 209 is activated to calculate an inverse data point value, as described in more detail below.

That is, the data point inverse calculation module 209 receives the calculation data from the data point calculation module 205 and/or data retrieval module 203, and uses this data to calculate values on and around data points that represent minima values. These minima values are those that the minima check module detected have been hidden from view due to larger values associated with a nearby data point.

Optionally, a drop off smoothing function module 211 may be used to calculate drop off values for the edges of the calculated data points in order to provide a smoother looking image, as will be described in more detail below with reference to FIG. 4C. The output of the drop off smoothing function module is communicated to the rendering module 213.

A rendering module 213 receives the output of the data point calculation module, inverse data point calculation module and drop off smoothing function module (if used) to render a suitable heatmap image using standard rendering techniques. This rendered heatmap image is then provided to an output module 215. That is, the rendering module uses the values calculated by the various modules to create a suitable output signal or file that enables a heatmap image to be rendered on the desired output module.

The output module may be a display device, such as a standalone display unit, or a display unit integrated with a laptop computing device, PC, hand held computing device, or other computing system or display system.

As an alternative to, or in conjunction with, the display module, further output modules may be provided to output the rendered image. That is, the raw data retrieved by the data retrieval module may be analyzed and converted to provide output data in a specific format. The output data may be provided to the display and/or further output modules to enable a user to visualize the raw data in a manner that conveys clear and concise information that is easy to be interpreted and understood.

The further output module may form part of a printing device in communication with the described system to receive print control data so that representations of the data may be printed on any suitable print medium. Alternatively, the further output module may be an interface that enables the data output to/from the rendering module to be interfaced with other data handling modules or storage devices. As a further alternative, the output module may be the same or different data storage module as described above.

Figure 2B:
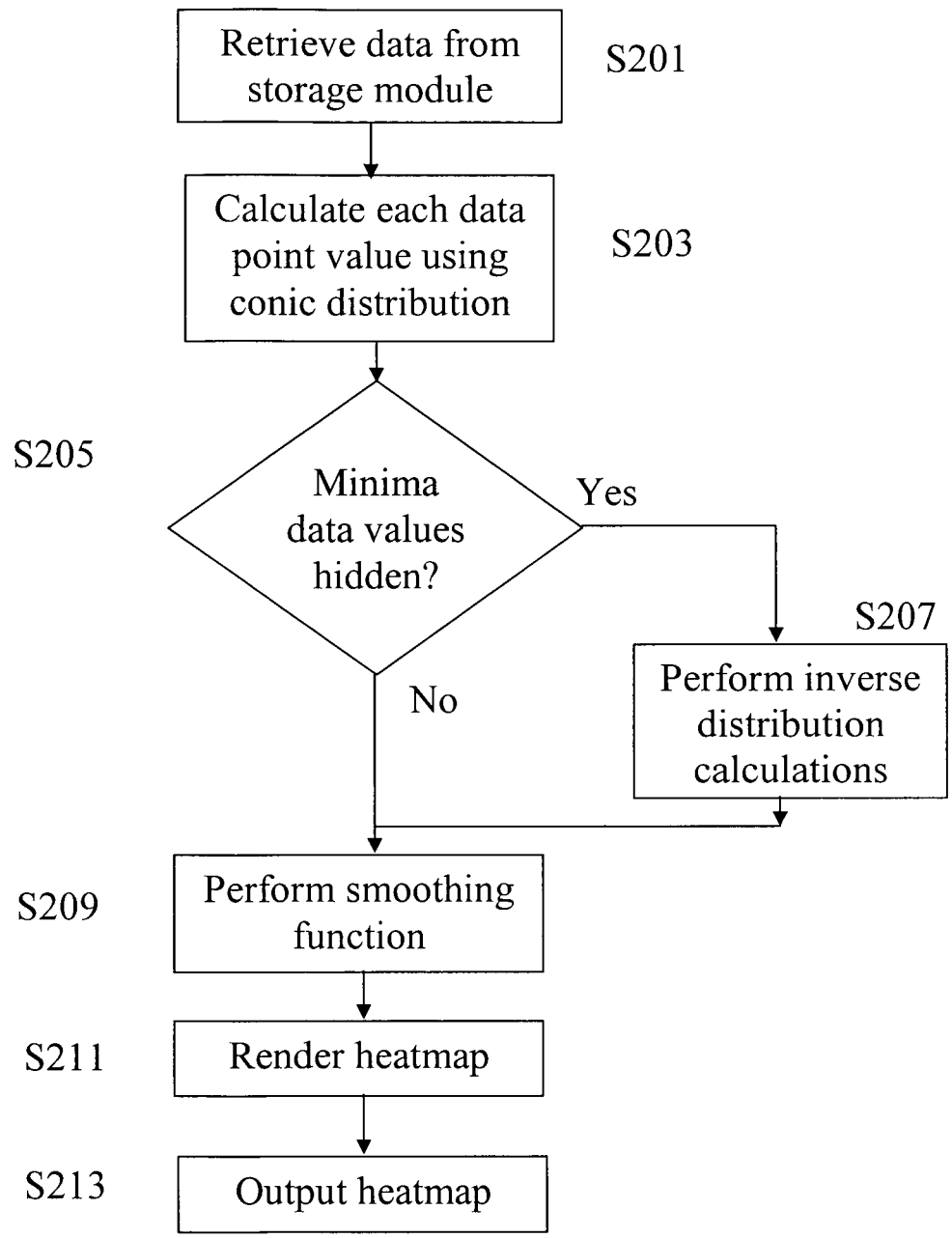
FIG. 2B shows a flow diagram for performing a heatmap generation method according to an embodiment of the present invention.

FIG. 2B shows a flow diagram for producing a heatmap according to this embodiment.

At step S201, the data retrieval module retrieves data from the data storage module.

At step S203, data point values are calculated for and around each data point using the data point calculation module distribution calculations.

At step S205, a minima data check is performed by the minima check module to see whether any of the data point values calculated by the data point calculation module exceed the actual data value that the data point is supposed to represent.

At step S207, for each data point that is detected as having a minima data value that is hidden, an inverse data point value is calculated by the inverse data point calculation module using an inverse distribution.

At step S209, the drop-off values are optionally calculated using the drop-off smoothing function module at the edge of data points to provide smoothing.

At step S211, the heat map image is rendered by the rendering module using the values calculated by the data point calculation module and inverse data point calculation module, and optionally the drop off smoothing function module.

At step S213 the rendered image produced by the rendering module is output to the output device.

There are certain key elements that a graphical visualization system designer should bear in mind when determining how and in what form a graphical image is to be visualized. For example, the graphical image should be visually pleasing to the user eye, understandable to the user such that it conveys relevant information about the data being represented and able to be efficiently produced by the system. The method of producing the image using a conic representation as described herein is far more efficient than those previously used to produce heatmaps, such as that shown in FIG. 1 for example.

Figure 3:
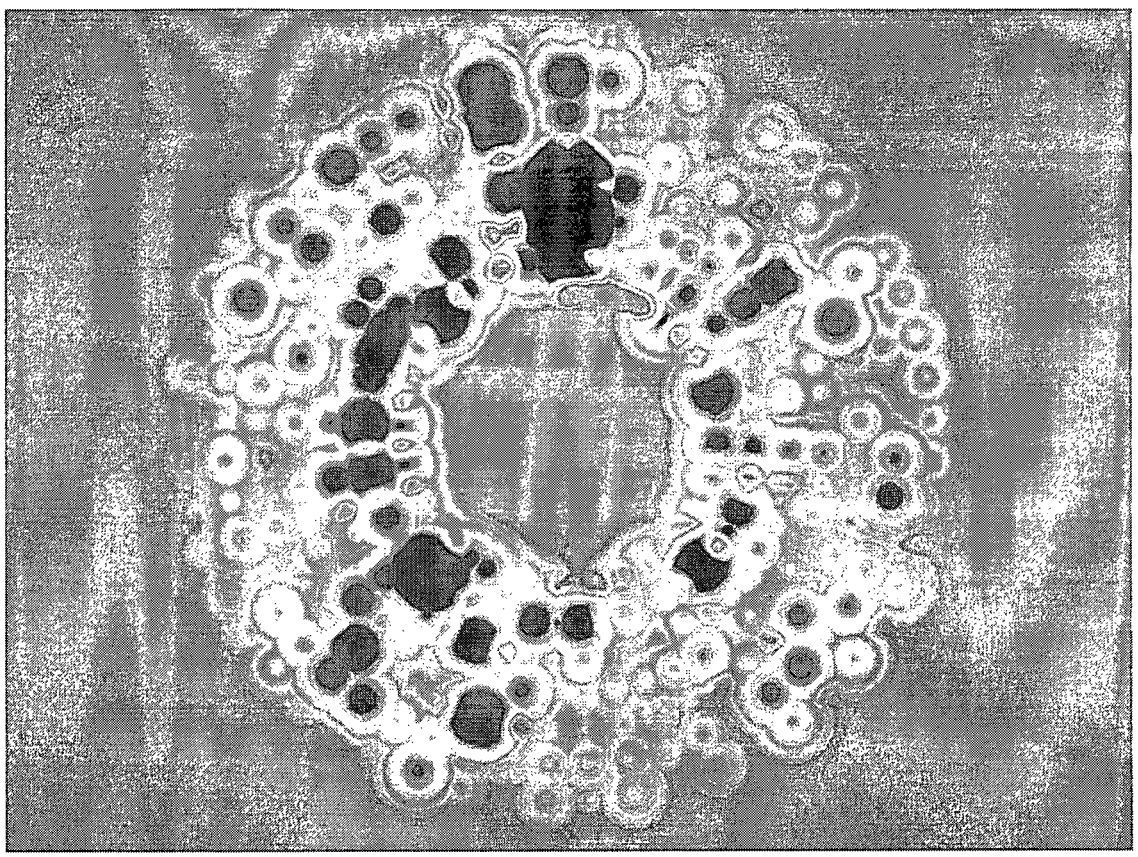
FIG. 3 shows a heatmap generated according to an embodiment of the present invention.

FIG. 3 shows a heatmap produced by a conic representation method as described herein. The image in FIG. 3 is very pleasing to the eye in nature. This is mainly due to its organic appearance even though the methods used to create the image are non-organic. Organic representations are generally known to be easier to read. Further, the image still conveys the information (which is based on the data points used) in a clear and succinct manner.

Further, the methods used to produce the image as herein described are far more efficient than the prior known methods used for producing heatmaps, such as those shown in FIG. 1.

The cone shaped distribution method used in this embodiment for rendering the image is described in more detail below with reference to FIGS. 4A, 4B, 4C, 5A and 5B.

Figure 4A:
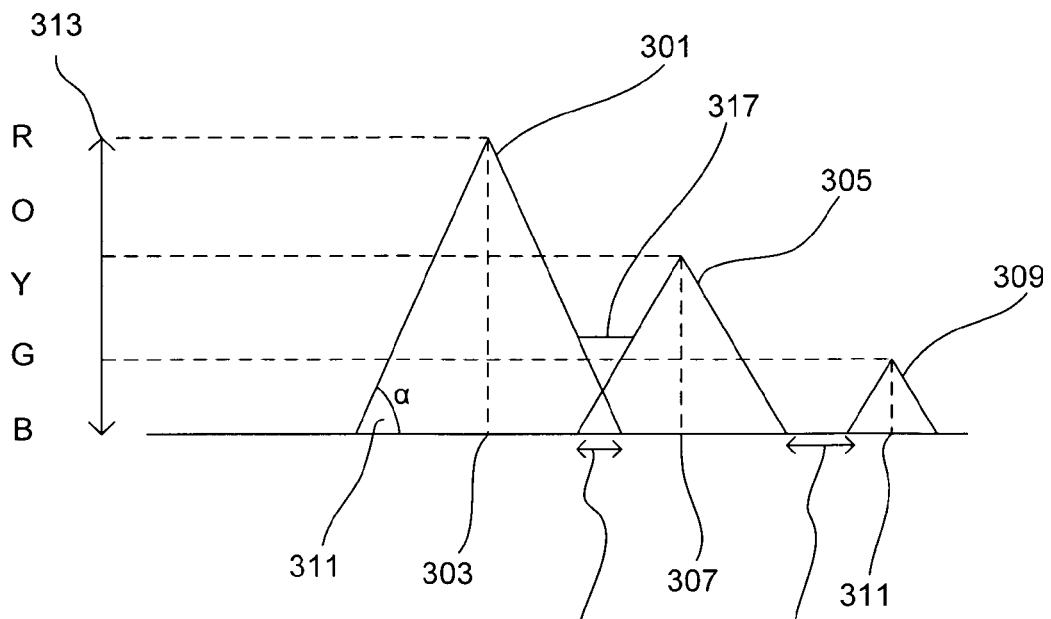
FIG. 4A shows a cross sectional view of a conic heatmap according to an embodiment of the present invention.

FIG. 4A shows a cross sectional view representative of a heatmap representation according to this embodiment. Data point value distributions are applied to and around each data point. According to this particular embodiment, the data point values are distributed using an exact cone shaped distribution.

Cone distribution 301 is calculated to represent data for data point 303, cone distribution 305 is calculated to represent data for data point 307 and cone distribution 309 is calculated to represent data for data point 311. Each cone distribution is sized according to the value of the data being represented at the associated data point.

According to this embodiment, the internal angle 311 between the base and side of each cone distribution is fixed. Therefore, as the data point value increases and decreases, the height and base of the cone varies. According to this embodiment, the angle is fixed at 45°. It is preferable that the angle used is between 40° and 50°. However, it will be understood that any suitable angle may be used where the data point values are distributed around the data point.

It will be understood that, as an alternative, the internal angle may be variable such that different value data points are represented by higher cones using a larger internal angle and smaller value data points are represented by shorter cones using a smaller internal angle. It will be understood that the base of the cone distribution for this alternative is fixed for each cone.

It can be seen in FIG. 4A that cone distribution 301 has a higher data point value than both of cone distributions 305 and 309. Further, cone distribution 305 has a higher data point value than cone distribution 309. That is, cone 301 is representative of a data point with a higher value than the data points which cones 305 and 309 represent.

Each of the conic distributions effectively provides each data point with a further dimension in which to represent a variable "Z". That is, the further dimension is the "height" of the data point, which indicates the "Z" variable for the data point being represented.

The values for each data point on the heatmap may be represented using colors or grey scales wherein the value calculated by the data point calculation module for each data point is represented using a range of colors or grey scales and the color chosen from the scale varies based on the calculated value for the distribution used.

According to this embodiment, a color scale 313 is provided to graphically indicate the height of the cone for each data point. The scale is the spectrum, from Red, through to Blue, including Orange, Yellow and Green in sequence. For example, the height of cone 301 is indicated in FIG. 4A as being level with the Red scale, and so the cone 301 will be rendered in Red. The height of cone 305 is indicated as being level with the Orange/Yellow scale, and so will be rendered using those colors accordingly. The height of cone 309 is indicated as being level with the Green scale and so will be rendered using a Green color. It will be understood that the appropriate colors used during the rendering stage may be determined from a look-up table.

In order to take into account the interaction of two overlapping cones, such as, for example, the cone distributions 301 and 305, color values are calculated by the data point calculation module and smoothed (or accumulated) for the overlapping region 315 on the heatmap. That is, the total value of the overlap is taken into account to indicate the cumulative (or additive) effect of the overlap.

Referring to FIG. 4A the cumulative sum of the heights (as indicated on the y-axis) of the cones is calculated using the data point calculation module across the x-axis to produce a cumulative value 317 for the combined cones. It will be understood that the height of the cones shown in FIG. 4A represent a specific variable value associated with the data points.

The cumulative effect of the overlap of two distribution regions is represented in the heatmap by a line 317, where the color of the line is determined by calculating the accumulated values of the crossed over distributions 301 and 305. The calculated accumulated value is then used to render the line in the associated color. In this example, the area on the heatmap representing this crossover portion is rendered using a color within the color range that aligns with accumulated value rather than the value that aligns with the exact point of cross over.

As an alternative, the overlap between the two distribution regions may be represented by using the higher of the two distribution values. That is, a cumulative or additive effect is not produced, but instead the outline of the distribution is maintained to indicate the higher of the distribution values of either of the overlapping distributions.

Optionally, a drop off function may be applied by the drop off smoothing function module to the edges of the cones to allow the values to drop more smoothly from the cone region into the areas 319 of the map that have no distribution. The steepness of the drop off function may be based on the height of the cone to enable a steeper drop off for shorter cones, and a shallower drop off for taller cones.

Figure 4B:
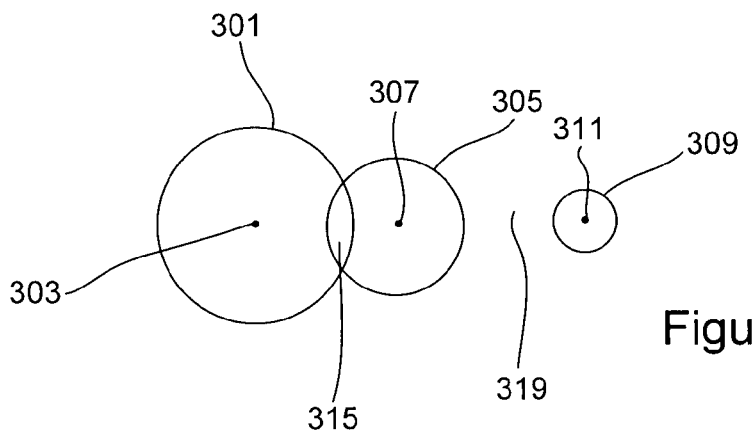
FIG. 4B shows a plan view of the cross section shown in FIG. 4A.
Figure 4C:
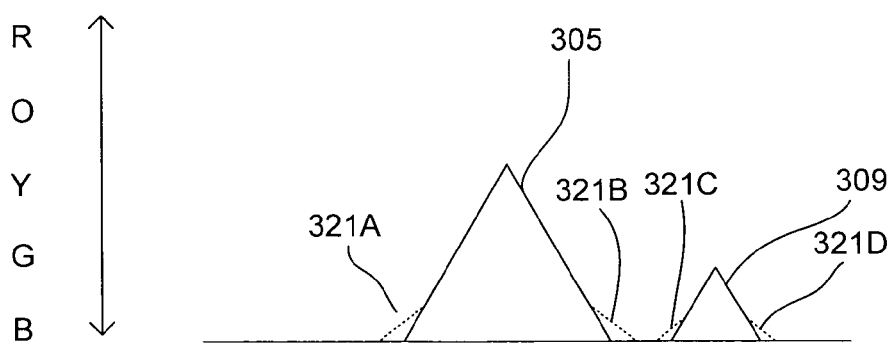
FIG. 4C shows a cross sectional view of a conic heatmap with a drop off smoothing function according to an embodiment of the present invention.

For example, referring to FIG. 4C, a cross sectional view of a conic heatmap with a drop off smoothing function can be seen. The cone distribution 305 includes drop off smoothing lines 321A and 321B calculated by the drop off smoothing function module. The cone distribution 309 includes drop off smoothing lines 321C and 321D also calculated by the drop off smoothing function module. Therefore, the colors used to represent the edges of the cones where they meet the minimal value (or background value) associated with the heatmap drop off more smoothly or in a shallower manner to provide a more aesthetic graphical image. The drop off smoothing function may be any suitable smoothing calculation. For example, a Gaussian blur function as described at en.wikipedia.org/wiki/Gaussian_blur may be used.

FIG. 4B shows a plan view of the cross section shown in FIG. 4A. The base of cone 301 is displayed next to the base of cone 305, with an overlap portion 315. The color of the base of cone 301 is red, which then blends into the color of cone 305, which is green/yellow. There is a cumulative effect at the overlap section as described above.

To take into account data points of a small value (e.g. minima) that are close to data points of a larger value (e.g. maxima), the following method may be used so that the smaller data point values are not swamped by the larger data point values and so can still be indicated on the graphical representation.

The minima check module determines whether the data values are correctly represented, i.e. that the calculated value is not greater that the actual value associated with the data point. If it is determined by the minima check module that the calculated values do not correlate with the actual data value, the inverse distribution is calculated as described below. The inverse distribution uses an exact conic distribution that is the inverse of the exact conic distribution used by the data point calculation module described above. That is, the cone shape is turned upside when viewing the cone as a cross section so that the apex of the cone is pointing towards the data point being represented.

Figure 5A:
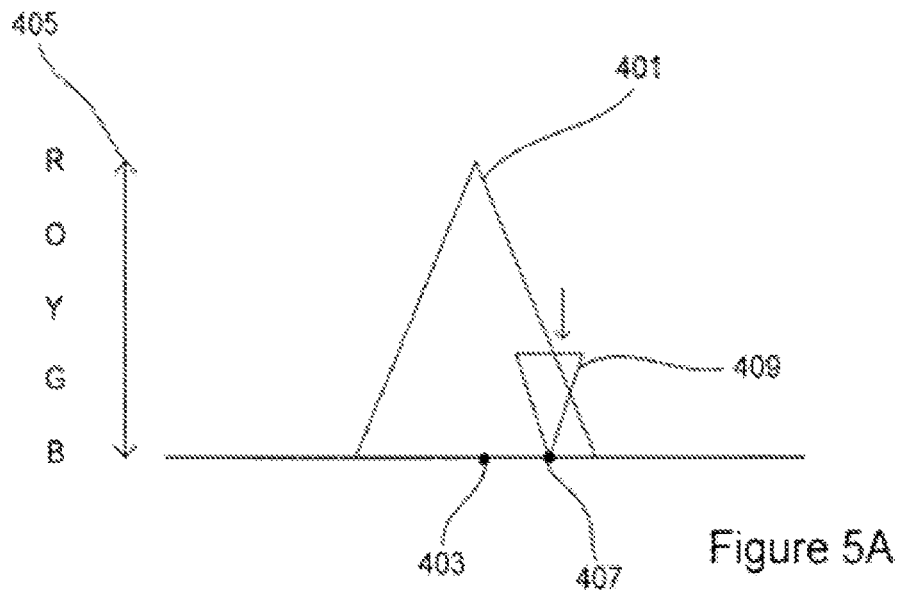
FIG. 5A shows a cross sectional view of a conic heatmap according to an embodiment of the present invention.

FIG. 5A shows a cross sectional view indicating how a heatmap is rendered using the inverse data point calculation module.

A first cone 401 indicating a larger value for a data point 403 is shown and represented using a color in the spectrum range 405, as discussed above.

A further smaller data point 407 (minima) is also present which is to be represented on the heatmap. However, this value is swamped by the calculated distribution. Therefore, the data for that smaller data point is represented by applying an inverse cone shaped distribution around the data point. An inverse cone 409 is applied by utilizing the same methodology as the cone shaped distribution, but in reverse (or upside down), so that the tip of the cone is placed on the surface of the representation with the base rising upwards to the appropriate point on the spectrum scale 405.

By applying an inverse cone as described, the value of its associated data point 407 is "drilled" through the larger cone 401 so that the data point value can be represented or viewed through the larger cone. That is, a hole is effectively created through the surface of the larger cone so the smaller data value can be visualized.

The overlap of the two cones may provide a cumulative effect on the spectrum value in that area by subtracting the data value for the minima as represented by data point 407 from the data value for the maxima as represented by data point 403.

Alternatively, the overlap of the cone distributions may be calculated by taking the minimum of the two data distribution values where they overlap.

Figure 5B:
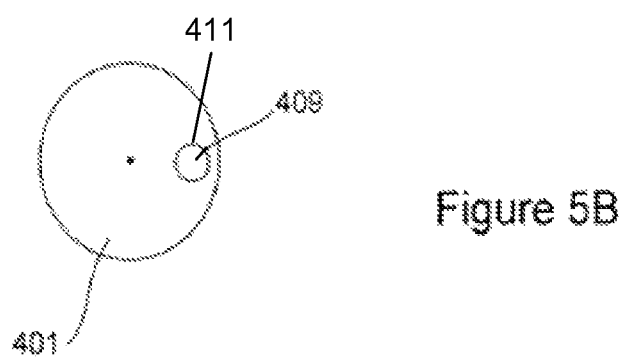
FIG. 5B shows a plan view of the cross section shown in FIG. 5A.

FIG. 5B shows a plan view of the cross section shown in FIG. 5A. As can be seen in FIG. 5B, the base of cone 401 would be represented in Red, whereas the base of cone 409 would be represented in a Green/Blue color thus providing a clear indication in the graphic that there is a minima value present in the area.

The colors between the two bases of the cones may be blended to provide a less garish and more pleasing image, as shown in FIG. 3. For example, referring to FIG. 5B, a smoothing function may be applied around the edge 411 of the smaller inverse cone to provide a smoothing effect at the boundary 411 with the larger cone.

The embodiments herein described provide significant advantages over the prior art. For example, the computational efficiency of calculating the heatmap values is increased as no interpolation steps are required. Further, spread functions that require a large amount of processing power are not required. Also, the metrics represented are true representations of the values of data associated with the source points.

Further, the data from one source point has no effect on distant points, unlike the traditional distribution curve where each point is affected by distant points. This means that the calculations performed using the herein described methods do not require threshold or limiting values (which can create distortions in the representation of the true values).

Further, the heatmap is represented using substantially conic distributions, which are less organic in nature than typical heatmaps and so it becomes possible for a user to see and determine values from the heatmap more accurately. This is because cone geometries are more deterministic in nature compared with the distributions used to form prior known heatmaps. Also the use of the various geometries described herein enables the source points to be made visibly clearer.

Therefore, a surface may be constructed that represents a heatmap together with the appropriate source point coordinates to form the basis of an accurate representation that can be subject to measurement for precise data representation; Thus providing a higher degree of metric representation. For example, in a gaming environment, where the heatmap methods described herein are used to represent data associated with a gaming floor, a user may be able to determine the value of a source point to within 1-3% of its actual value rather than 2-5% for a traditional heatmap.

According to the herein described methods a surface is not created to form the heatmap, as performed in prior known methods. Rather, a graphical method is provided to indicate the data values associated with the data points.

Second Embodiment

The same system components as used above in the first embodiment are also used in this second embodiment.

As mentioned above, the conic distribution of the data value around a data point may be carried out using other suitable conic type forms of distribution. According to this embodiment, the data point values are distributed using a frustoconical or "tent" shaped distribution as applied by the data point calculation module and inverse data point calculation module.

Figure 6A:
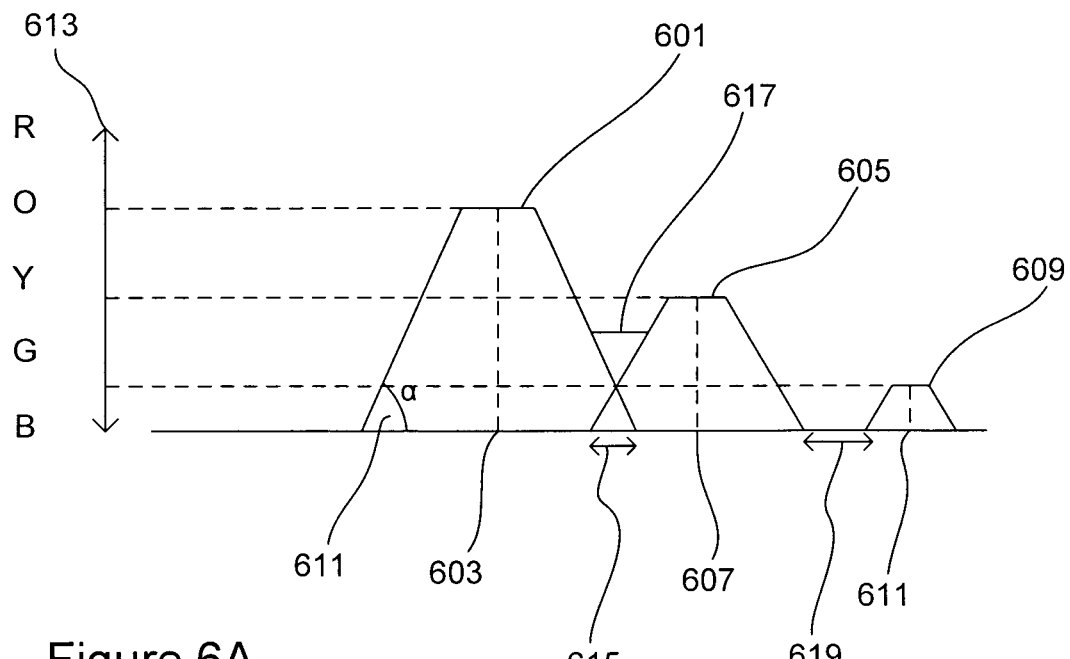
FIG. 6A shows a cross sectional view of a frustoconic heatmap according to an embodiment of the present invention.

Referring to FIG. 6A a cross sectional view is provided that indicates how a heatmap is rendered using the data point calculation module of the first embodiment modified to use a frustoconical distribution.

Figure 6B:
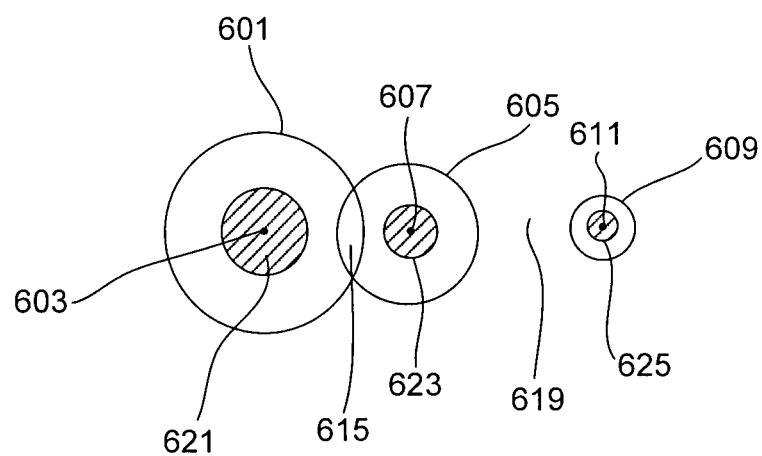
FIG. 6B shows a plan view of the cross section shown in FIG. 6A.

Referring to FIG. 6B a plan view of the cross section shown in FIG. 6A is provided.

According to this embodiment, a color scale 613 is provided as in the first embodiment. The heights of the frustoconical distributions 601, 605 and 609 determine the color used to render the distribution.

Values are calculated by the data point calculation module in the same manner as described in the first embodiment but using a different distribution around the data point.

Referring to FIG. 6A the cumulative sum of the heights (as indicated on the y-axis) of the distributions is calculated using the data point calculation module across the x-axis to produce a cumulative value 617 for the combined distributions. It will be understood that the heights of the frustoconical shapes shown in FIG. 6A represent a specific variable value associated with the data points.

The cumulative effect of the overlap of two distribution regions is represented in the heatmap by a line 617, where the color of the line is determined by calculating the accumulated values of the crossed over distributions 601 and 605. The calculated accumulated value is then used to render the line in the associated color.

As in the first embodiment, the overlap may be calculated by taking the maximum of the two distributions rather than applying an additive algorithm.

Optionally, as in the first embodiment, a drop off function may be applied by the drop off smoothing function module to the edges of the distributions to allow the values to drop more smoothly from the frustoconical region into the areas 619 of the map that have no distribution.

FIG. 6B shows a plan view of the cross section shown in FIG. 6A. The base of frustoconical distribution 601 is displayed next to the base of frustoconical distribution 605, with an overlap portion 615. Further, the top of the frustoconical distribution 601 is visible as an area 621, for distribution 605 as an area 623 and for distribution 609 as an area 625.

To take into account data points of a small value (e.g. minima) that are close to data points of a large value (e.g. maxima), the same method as used in the first embodiment is used in this embodiment to ensure that the smaller data point values are not swamped or hidden by the larger data point values and so can still be visualized on the graphical representation.

The minima check module determines whether the data values are correctly represented, i.e. that the calculated value is not greater that the actual value associated with the data point. If it is determined by the minima check module that the values are not correctly represented, then the inverse distribution is calculated, as in the first embodiment.

Figure 7A:
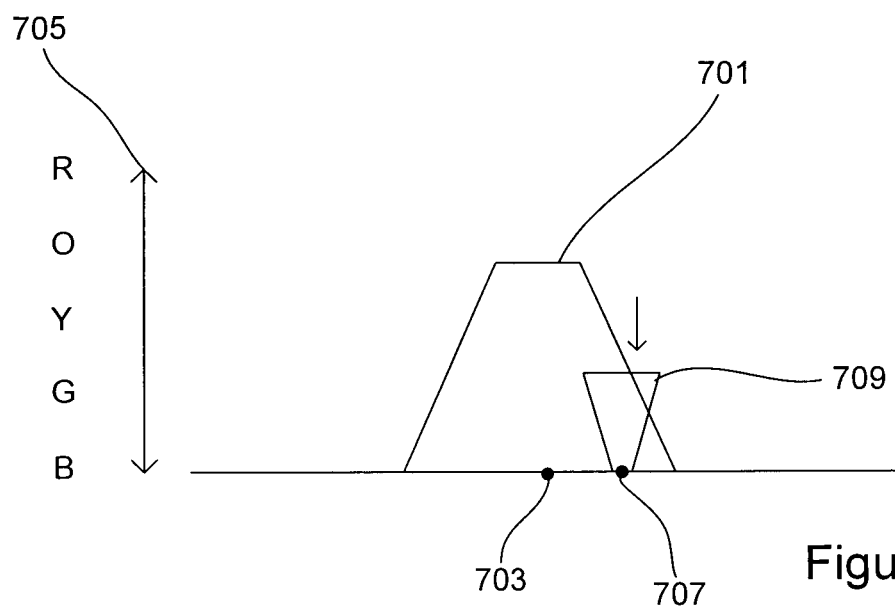
FIG. 7A shows a cross sectional view of a frustoconical heatmap according to an embodiment of the present invention.

FIG. 7A shows a cross sectional view indicating how a heatmap is rendered using the inverse data point calculation module.

A first frustoconical distribution 701 indicating a larger value for a data point 703 is shown and represented using a color in the spectrum range 705, as described in the first embodiment.

A further smaller data point 707 (minima) is also present which is to be represented on the heatmap. The data for that smaller data point is represented by applying an inverse frustoconical shaped distribution around the data point. An inverse distribution 709 is applied in the same manner as described in the first embodiment. Therefore, the top surface of the frustoconical distribution is positioned on the x-axis (i.e. upside down).

By applying an inverse distribution as described, the value of its associated data point 707 is drilled through the larger distribution 701 so that it can be viewed in a similar manner as described in the first embodiment.

The overlap of the two distributions may provide a cumulative effect on the spectrum value in that area by subtracting the data value for the minima as represented by data point 707 from the data value for the maxima as represented by data point 703.

As in the first embodiment, alternatively, the overlap may be calculated by taking the minimum of the two distributions rather than applying a cumulative algorithm.

Figure 7B:
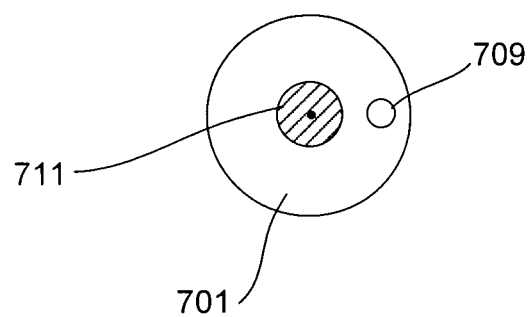
FIG. 7B shows a plan view of the cross section shown in FIG. 7A.

FIG. 7B shows a plan view of the cross section shown in FIG. 7A. As can be seen in FIG. 7B, the distribution 701 would be represented according to the color scale 705. An area 711 represents the top flat surface of the frustoconical distribution, whereas the base of the distribution 709 is represented. This therefore provides a clear indication in the graphic that there is a minima value present in the area.

As in the first embodiment, a smoothing function may be applied around the edges of the distributions.

Third Embodiment

The same system components as used in the above described first and second embodiments are also used in this third embodiment.

Again, as mentioned above, the conic distribution of the data value around a data point may be carried out using other suitable conic type forms of distribution. According to this embodiment, the data point values are distributed using a skewed conic distribution as applied by the data point calculation module and inverse data point calculation module.

Figure 8A:
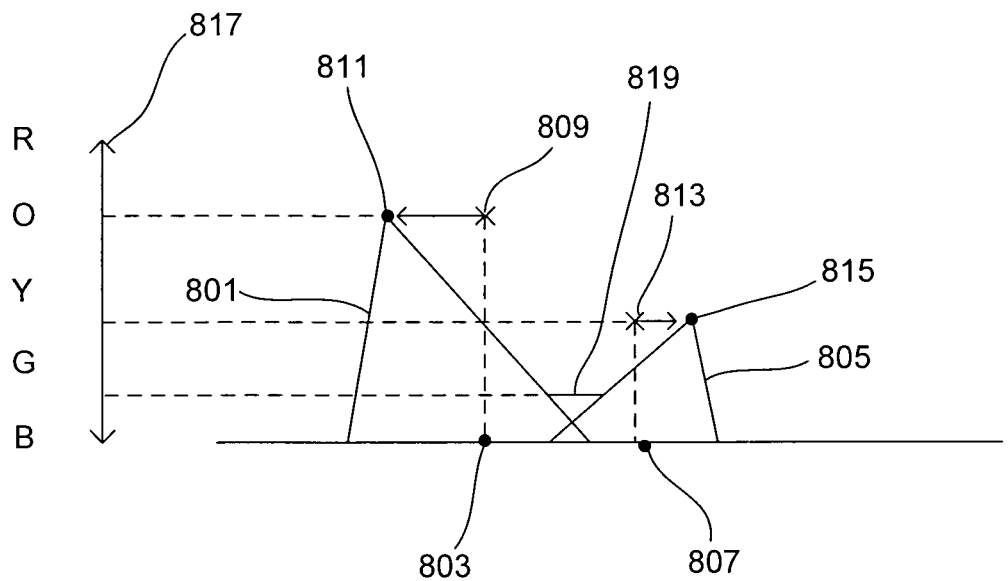
FIG. 8A shows a cross sectional view of a skewed conical heatmap according to an embodiment of the present invention.

Referring to FIG. 8A, skewed cone distribution 801 is used to represent data for data point 803, and skewed cone distribution 805 is used to represent data for data point 807. For a standard cone distribution, the tip or apex of the cone 801 would be in the position indicated by point 809. However, according to this embodiment, the apex is moved from point 809 in the direction of the arrow to point 811 to form a skewed conic distribution. Also, for a standard cone distribution, the tip or apex of the cone 805 would be in the position indicated by point 813. However, according to this embodiment, the apex is moved parallel to the base from point 813 in the direction of the arrow to point 815 to form a skewed conic distribution.

In this embodiment, the rendering of the distribution utilizes the same color mapping techniques as described above by using a color scale 817. Other forms of rendering are envisaged as described in the previous embodiments.

By using a skewed conic distribution as described, the overlap of the cones forms a line 819. The color value for this line is lower than that of the standard cone distribution. Thus, the visual appearance of the actual values of the source points (803 and 807) is enhanced. That is, the overlap values of the skewed cones have a reduced effect on the visual representation thus producing an increased visual effect of the actual source points. Further, individual points are distinguished whilst maintaining the overall effect of all data points in the representation.

As in the above described embodiments, the overlap may be calculated by taking the maximum of the two distributions rather than applying an additive algorithm.

Figure 8B:
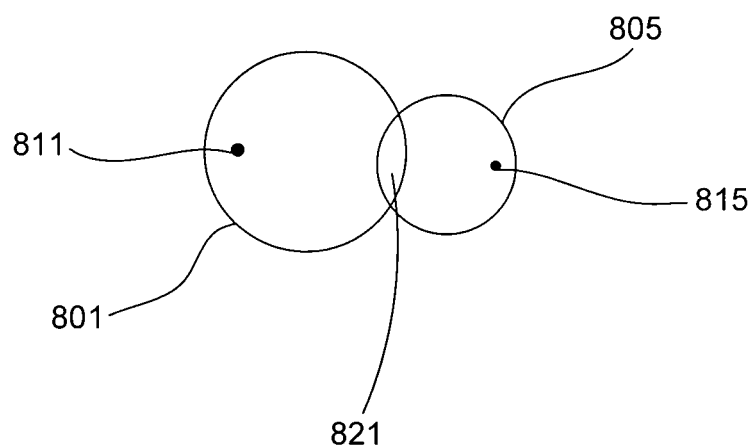
FIG. 8B shows a plan view of the cross section shown in FIG. 7A.

FIG. 8B shows a plan view of the representation where the overlap area 821 appears as the same size as would appear if a standard conic distribution were used. However, the color value attributed to that area has a lower heat value so that the source point values are enhanced.

It will be understood that the inverse conic methods described above in the previous embodiments may also be applied to this embodiment where they are adapted to apply an inverse skewed cone distribution for viewing minima data values.

Therefore, the data visualization techniques herein described in the various embodiments transform the raw data received into a visual representation of the data to enable further or hidden information within the raw data to be visually represented in a manner that conveys the information to a user in an efficient manner. For example, both fine detail and course detail associated with the data is easily interpretable from the heatmap produced using the various methods.

Further Embodiments

It will be understood that the embodiments of the present invention described herein are by way of example only, and that various changes and modifications may be made without departing from the scope of invention.

Figure 9:
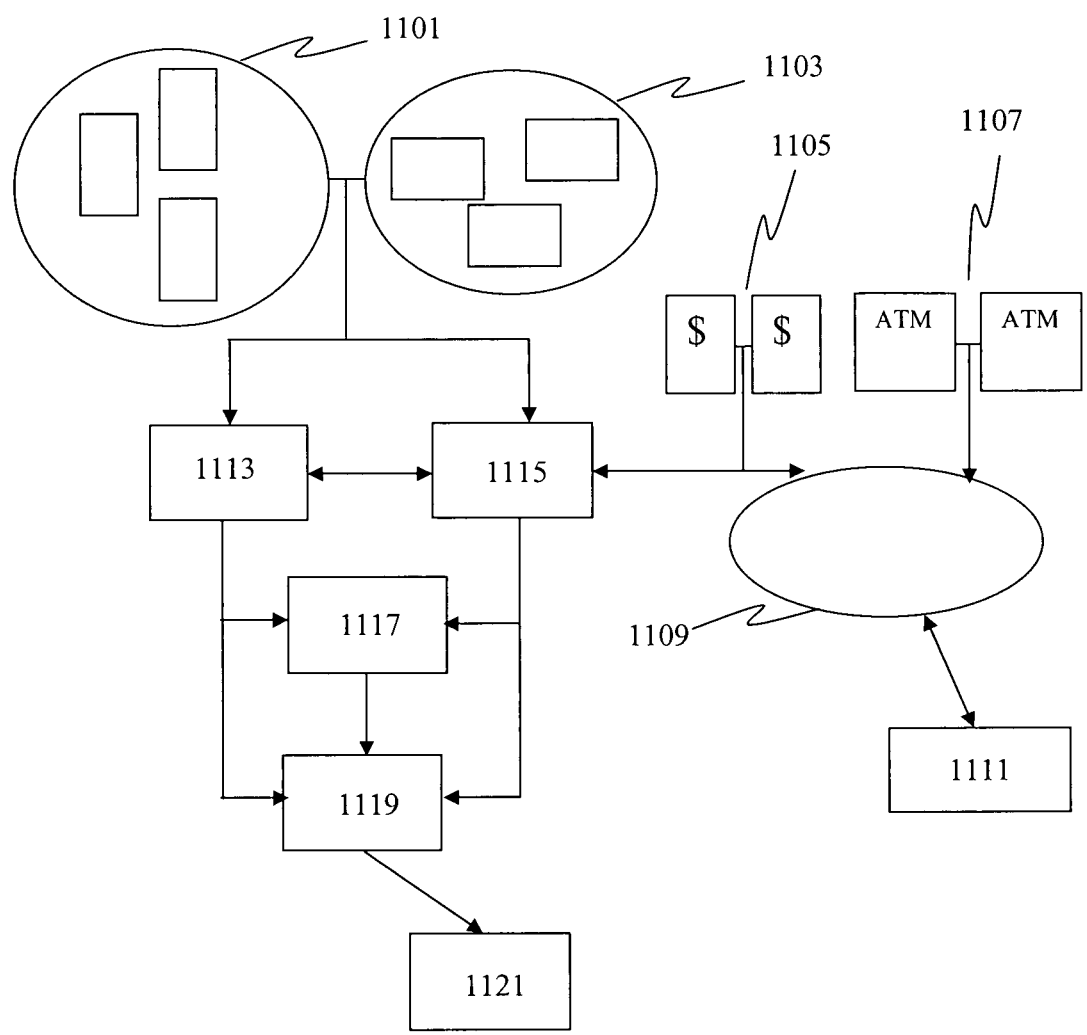
FIG. 9 shows a system diagram of a gaming environment according to an embodiment of the present invention.

FIG. 9 shows an example of how any of the above described embodiments may be incorporated within a gaming environment. The gaming environment consists of a number of gaming machines 1101 and electronic tables 1103 (among other electronic gaming devices) that are adapted to communicate electronically with other systems using any suitable protocols, such as data packet protocols.

The gaming environment further includes a number of electronic cashier devices 1105 and ATMs 1107 which are in communication via a Wide Area Network 1109 with one or more financial databases 1111.

Data from the gaming machines 1101 and electronic tables 1103 are transferred to a reward program database 1113 and customer database 1115. It will be understood that these two databases may be combined into a single database.

Data from the cashier devices are also transferred to the reward program database 1113 and customer database 1115. The databases 1113 and 1115 are in communication with a central hotel management system 1117 that oversees the operation of the gaming environment, including the activities of customers in other areas of a casino, such as shops, hotels, spas etc.

The system 1119 as described in the above embodiments is in communication with the reward program database 1113, customer database 1115 and central hotel management system 1117 so the system can retrieve all necessary data about the activities within the gaming environment and produce heatmaps according to the various methods based on the data. The various embodiments as described herein are employed by the system 1119 to provide an output 1121.

It will be understood that the method steps described above may be implemented using any suitable tool. For example, the method may be implemented using software code developed to perform the described methods. Alternatively, the method may be implemented using a programmed chip set arranged to perform the method steps. For example, the chip set may form part of a printing device specifically arranged to carry out the method of producing the herein described heatmaps. The chip set may be a hardwired chip set, programmable chip set, or software controlled chip set. Further, a hard wired or programmable computer system may be used to carry out the method steps.

What we claim is:

1. A method implemented on an electronic computing device of creating a graphical representation of data in the form of a heatmap, the method including the steps of:
    on the electronic computing device, positioning data points on a heatmap for graphical representation;
    calculating conical data distribution values around a first data point based on a first data value associated with the first data point;
    determining whether a conical data distribution value around the first data point is greater than a second data value for a second data point that is proximate to the first data point such that the conical data distribution for the first data point overlaps the second data point;
    upon a positive determination, automatically adjusting the second data value by applying an inverse conical distribution around the second data point; and
    rendering the heatmap based on the calculated data distribution values and the adjusted second data value, so that the second data point is visible on the heatmap.

2. The method of claim 1 further including the step of calculating data values for additional data points graphically located between data points based on the conical distribution.

3. The method of claim 2 further including the steps of:
    determining whether a conical distribution value for each additional data point is greater than the data value associated with the additional data point, and,
    upon a positive determination, calculating inverse conic data distribution values around the additional data point based on the data value.

4. The method of claim 3 further including the steps of rendering the heatmap using the additional data points based on the conic data distribution values and inverse conic data distribution values.

5. The method of claim 3 wherein the inverse conical data distribution values are calculated by applying one of an inverse frustoconical distribution, an exact inverse conical distribution or a skewed inverse conical distribution to the data value.

6. The method of claim 1, wherein the conical data distribution values are calculated by applying one of a frustoconical distribution, an exact conical distribution or a skewed conical distribution to the data value.

7. The method of claim 1 further including the step of calculating accumulated distribution values where data distribution values for multiple data points overlap.

8. The method of claim 1 further including the step of applying the highest distribution value of multiple data points where data distribution values for the multiple data points overlap.

9. The method of claim 1 further including the step of adjusting the data distribution values at the edges of the distribution to provide a smoothing effect.

10. The method of claim 1 wherein the data is gaming data associated with a gaming environment or retail data associated with a retail environment.

11. A graphical computing system for generating a heatmap including:
    a processor; and
    a memory device, the memory device including instructions that when executed by the processor cause the graphical computing system to implement:
    a data point calculation module arranged to position data points on a heatmap for graphical representation, and calculate conical data distribution values around a data point based on a data value associated with that data point;
    a minima detection module arranged to determine whether the data distribution values for the data point are greater than the data value associated with that data point, and an inverse data point calculation module arranged to, upon a positive determination by the minima detection module, calculate inverse conical data distribution values around the data point based on the data value; and
    a rendering module arranged to render the heatmap based on the calculated data distribution values such that any detected minima data points are visible on the heatmap.

12. The system of claim 11 wherein the rendering module is arranged to render the heatmap using the data points based on the conic data distribution values and inverse conic data distribution values.

13. The system of claim 11 wherein the inverse data point calculation module is arranged to calculate the inverse conical data distribution values by applying one of an inverse frustoconical distribution, an exact inverse conical distribution or a skewed inverse conical distribution to the data value.

14. The system of claim 11, wherein the data point calculation module is arranged to calculate the conical data distribution values by applying one of a frustoconical distribution, an exact conical distribution or a skewed conical distribution to the data value.

15. The system of claim 11 wherein the data point calculation module is arranged to calculate accumulated distribution values where data distribution values for multiple data points overlap.

16. The system of claim 11 wherein the data point calculation module is arranged to calculate a highest distribution value from multiple data points where data distribution values for the multiple data points overlap.

17. The system of claim 11 further including a smoothing module arranged to adjust the data distribution values at the edges of the distribution to provide a smoothing effect.

\* \* \* \* \*